Oct. 2, 1934.　　　F. H. FAY ET AL　　　1,975,203

PRINTING TELEGRAPH SYSTEM

Filed Sept. 7, 1932　　2 Sheets-Sheet 1

INVENTORS: F. H. FAY
W. M. BACON
BY
ATTORNEY

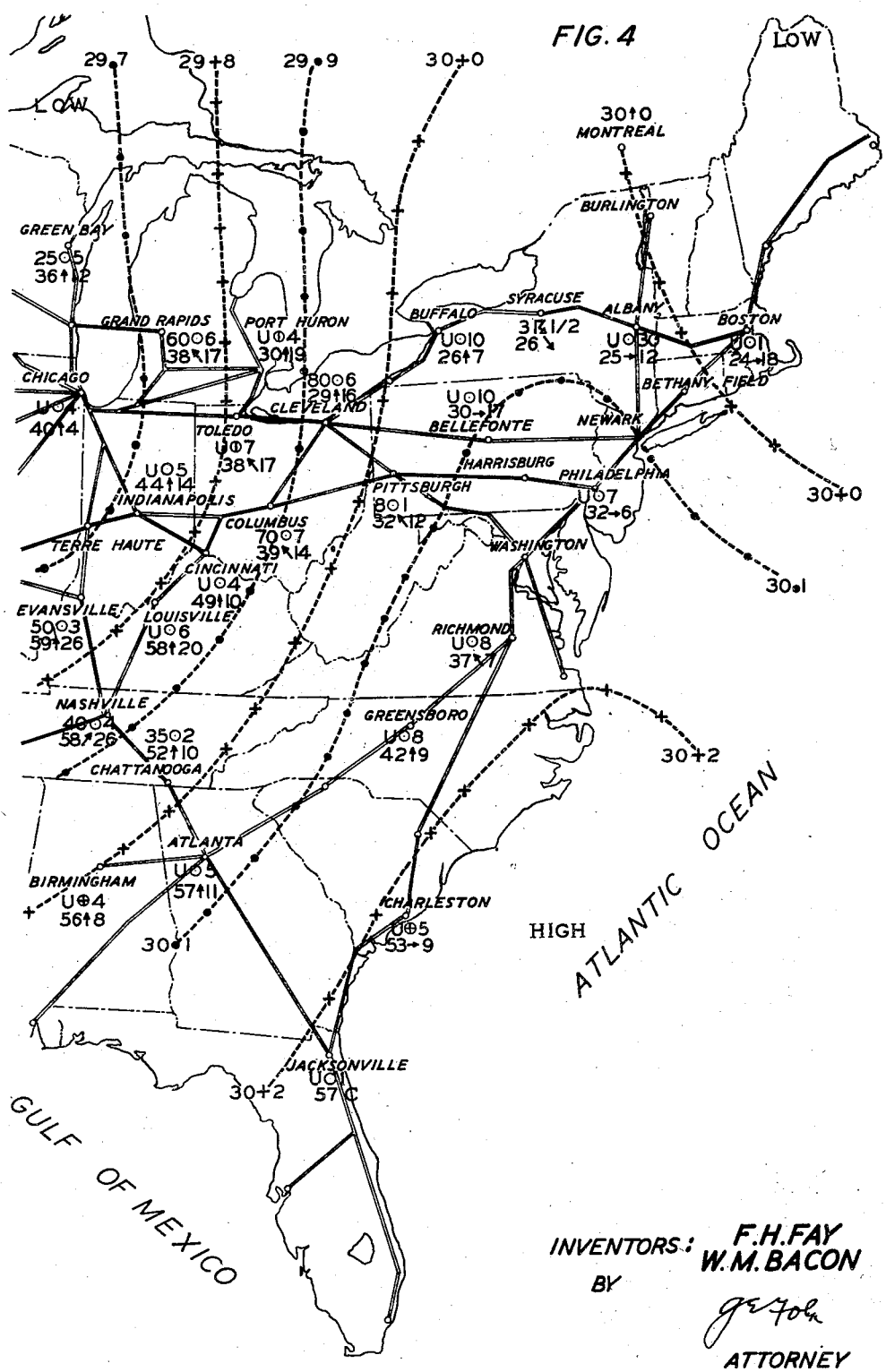

Patented Oct. 2, 1934

1,975,203

UNITED STATES PATENT OFFICE 1,975,203

PRINTING TELEGRAPH SYSTEM

Frank H. Fay, Huguenot Park, and Walter M. Bacon, Pelham Manor, N. Y., assignors to American Telephone and Telegraph Company, a corporation of New York Application September 7, 1932, Serial No. 632,014

4 Claims. (Cl. 178—5)

This invention relates to the transmission of maps over a transmission system.

More particularly, this invention relates to a transmission system in which maps are transmitted from one printing telegraph set contained therein to one or more other printing telegraph sets also contained therein. The transmission system which is used may comprise one or more telegraph circuits, radio links, or any other desired form of electrical transmission.

Various organizations regularly transmit to their branches information which is in the form of maps. For example, meteorological stations send out weather maps to various airports throughout the country and army signal corps stations send overlay and route maps to various other army stations.

Usually in all cases, time is of the essence. In regard to the first example given above, it may be stated that weather hazards are the greatest obstacles to reliable air transportation. Adverse weather conditions cannot be controlled but they may often be avoided if information relating to their locations and the direction of their movements is promptly supplied. Furthermore, due to the rapidity with which weather conditions change, considerable delay in the transmission and reproduction at a distance of weather maps renders them of little value. Therefore, it is desirable to have some method of quickly and economically transmitting weather maps to various airports throughout the country in order that pilots may have the most recent information about weather conditions in concise and simple form.

As for the second example, during actual warfare it is of paramount importance that overlay and route maps should be quickly transmitted from one point to another in order that forces may be quickly massed to defend an indicated attack or to make a sudden onslaught. Formerly such maps were manually transmitted by messengers thereby consuming considerable time as well as being subject to the hazard of the incapacitating of messengers either by capture or gun fire.

It is an object of this invention to provide a method for the transmission of maps over a telegraph circuit.

Another object of this invention is the transmission by a printing telegraph set of maps over a telegraph circuit to another printing telegraph set connected thereto.

Another object of the invention is the transmission by a broadcasting printing telegraph set of maps over a plurality of telegraph circuits to a plurality of broadcast receiving printing telegraph sets connected thereto.

A feature of the invention is the use in a printing telegraph set of a special typing unit comprising type slugs for typing upon weather maps symbols peculiar to weather maps.

Another feature of the invention is the use in a printing telegraph set of a special typing unit comprising type slugs for typing upon army overlay and route maps symbols peculiar to such maps.

Still another feature is the use in a broadcasting printing telegraph set of an indicating device to facilitate the printing of symbols in their proper locations upon a map.

For purposes of illustration the transmission of weather maps by means of this invention will now be described with reference to the accompanying drawings, in which:

Fig. 4 is a reproduction of a typical map as transmitted and received in accordance with the present invention.

Figure 1:
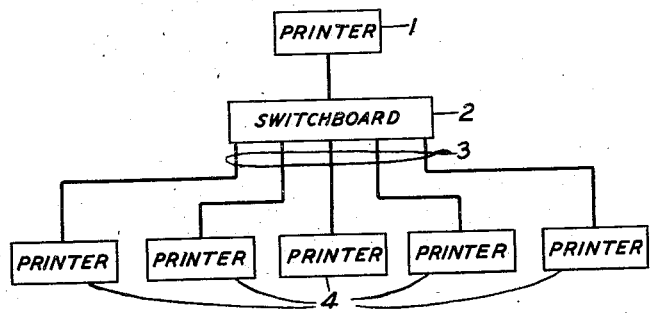
Figure 1 represents a broadcasting printing telegraph system.

In accordance with this invention, a broadcasting printing telegraph system, such as that shown schematically in Fig. 1, is used. A broadcasting printing telegraph set 1 is located at a weather bureau which is to furnish weather information to airports. Connected to the broadcasting printer 1 by means of a broadcasting switchboard 2 are several telegraph circuits 3. These are connected also to receiving printing telegraph sets 4 located at various airports throughout the country.

Figure 2:
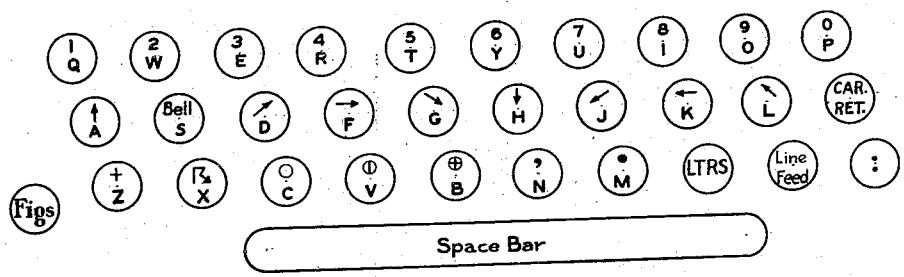
Fig. 2 represents a key board which is typical of those used by the printing telegraph sets shown in Fig. 1.

Each of the printing telegraph sets 4 has a special typing unit. This unit is made up of type slugs bearing symbols thereon which specially relate to that type of information which is given on a weather map. Associated with these type slugs is a key board having symbols thereon which correspond to the symbols upon the type slugs. Such a key board is shown in Fig. 2. It may be observed that among the symbols are several arrows each of which points in a direction which is different from that of any of the others. These are used for indicating wind directions. General weather conditions may be represented by special or regular characters, such as a circle for fair weather, a circle having a vertical diameter for partly cloudy weather, and a circle having a horizontal diameter intersected at right angles by a vertical diameter for overcast or cloudy weather. Rain and snow may be represented by the letters R and S. Thunder storms may be shown by a jagged arrow. Other special or additional symbols may be employed if desired.

In carrying out this invention it is necessary to construct at the weather bureau a master weather map based upon the meterological information which the weather bureau has collected. This is usually done by manually writing this information upon a blank weather map thereby transforming it from a blank to a master weather map. This master weather map is then visually scanned for transmission by the broadcasting printer 1 and the observations made are transmitted. Manual scanning requires only the insertion of the master weather map into the broadcasting printer 1 and the tracing of it by printing thereon with the broadcasting printer 1 using the special typing unit. It will be found convenient to commence the tracing of the map at its upper left-hand corner and to progress line by line horizontally across its surface. The tracing process is accomplished by the broadcasting printer 1 printing over, or on top of, the information located at various points upon the master map and also typing coordinate points upon isobars and isotherms.

Figure 3:
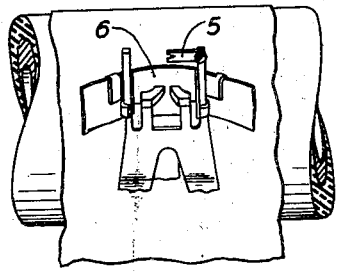
Fig. 3 represents an indicating device to facilitate the printing of symbols in their proper locations upon the maps.

In order to facilitate the printing of the symbols upon the weather maps in their proper locations, it is desirable to use an indicating device, such as is shown in Fig. 3. This comprises a small metallic finger 5 located near the ribbon guide opening 6 of the broadcasting printer 1.

In typing upon such weather maps the broadcasting printer 1 sends out a series of signal impulses. These impulses go out to the broadcasting switchboard, over the telegraph circuits 3, and are received by the receiving printers 4 which are then set into operation corresponding to the operation of the broadcasting printer 1. The operation of the receiving printers 4 is thus controlled by the signal impulses transmitted from the broadcasting printer 1. Accordingly, if blank weather maps are inserted in the receiving printers 4, reproductions of the printing done by the broadcasting printer 1 will be made thereon. The complete isobars and isotherms may be constructed by manually drawing lines through the reproduced coordinate points. In order to avoid confusion, it is advisable to employ different symbols for different isobaric and isothermic lines.

The typical map shown in Fig. 4 is a copy of a specimen map transmitted for the benefit of airplane pilots. It graphically indicates the kind of results which may be achieved by means of the method and apparatus of the present invention. It can be seen that the coordinate points of the isobaric lines are represented alternately by periods and plus signs. The use of two different symbols prevents errors which might otherwise arise. Since isobaric lines do not cross over each other, only two different symbols are needed. For the sake of simplicity isothermic lines are not shown. If they were shown, it would be advisable to use four different symbols because they cross over the isobaric lines. No additional manual treatment is required for the other information upon the maps, such as the symbols for indicating general weather conditions, wind directions, etc.

For the transmission of other kinds of maps a similar procedure is used. Since the nature of the information upon the maps may vary, it may be desirable to use new and different symbols. For example, in the case of army overlay maps, new and different symbols could be used for indicating such information as the numerical number of a unit, the size of a unit, the type of a unit, its branch of service, etc.

For some cases, two stations might be sufficient but for other cases, such as the transmission of army overlay maps, it might be desirable to employ a printing telegraph switch exchange instead of a simple printing telegraph broadcasting system. Such an exchange would comprise a plurality of printing telegraph stations connected to a central switchboard by means of a plurality of telegraph circuits. If this were the case, then Fig. 1 could be representative of such an exchange if 1 were an operator's set, 2 a central switchboard, and 4 sending and receiving printing stations.

If it should be desired to make multiple copies of a map, this could be done by means of the cutting of a stencil by a receiving printer acting in accordance with the signal impulses which it receives. Multiple copies may then be readily made by placing the stencil in a mimeograph machine and reproducing it upon blank maps or plain sheets of paper.

The method of transmitting maps, which has been described above, is accurate, quick, and economical. At the same time it is relatively simple to employ and does not require highly trained operators.

This use of the invention is illustrative of its operation. The invention need not be limited in its use to the transmission of weather or military maps. It may be used for transmitting information to be recorded on maps, graphs, or charts for any purpose. If the operator of the broadcasting printer is particularly skillful, the indicating device may not be necessary and may be removed. In short the terms of the claims apended hereto are not to be restricted to the precise construction herein disclosed but are intended to cover all changes and modifications within the spirit and scope of the invention.

Where, in the appended claims the term "graph" is used it includes such graphs as isotherms, isobars, and regular or irregular lines of other significance, such as lines of an army front or a line of trenches.

What is claimed is:

1. A printing telegraph set having a special typing unit comprising type slugs bearing symbols thereon to be used in the typing of maps, said symbols comprising a plurality of arrows each of which points in a direction which is different from that of any of the others, a jagged arrow, a circle, a circle having a vertical diameter, and a circle having a horizontal diameter intersected at right angles by a vertical diameter, said printing telegraph set also comprising a key board having symbols thereon which correspond to the symbols upon the type slugs.

2. An arrangement for the transmission of weather maps over a transmission system, said arrangement comprising in combination a telegraph circuit and a plurality of printing telegraph sets connected thereto, said printing telegraph sets each having a special typing unit comprising type slugs having individual symbols indicative of weather conditions for typing upon weather maps symbols for indicating general weather conditions, wind directions, isobaric information, and isothermic information.

3. An arrangement for the transmission of military maps over a transmission system, said arrangement comprising in combination a telegraph circuit and a plurality of printing telegraph sets connected thereto, said printing telegraph sets each having a special typing unit comprising type slugs having individual symbols indicative of military data for typing upon such maps symbols for indicating information peculiar to such maps, such as the numerical number of a unit, the type of a unit, the size of a unit, and its branch of service.

4. The method of transmitting a map over a transmission system comprising a telegraph circuit and a plurality of printing telegraph sets, said method comprising the insertion of the particular map to be transmitted into one of the printing telegraph sets and a blank map into another of the printing telegraph sets, the typing by the first mentioned printer of coordinate points of graphs on the particular map being transmitted, the typing over by the first printer of other information located at various points upon the map, the transmission over the telegraph circuit of the signal impulses produced by the first printer during the typing operations, the reception of these signal impulses by the second mentioned printer, and the duplication upon the blank map of the coordinate points and other information by means of the second printer typing upon the blank map in accordance with the signal impulses which it receives from the first printer.

FRANK H. FAY.
WALTER M. BACON.